(12) United States Patent
Bjarno et al.

(10) Patent No.: US 9,375,675 B2
(45) Date of Patent: Jun. 28, 2016

(54) DEVICE AND A METHOD OF CLEANING AN EFFLUENT GAS FROM AN ALUMINIUM PRODUCTION ELECTROLYTIC CELL

(71) Applicant: ALSTOM Technology Ltd, Baden (CH)

(72) Inventors: Odd Edgar Bjarno, Oslo (NO); Geir Wedde, Oslo (NO)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 14/969,734

(22) Filed: Dec. 15, 2015

(65) Prior Publication Data

US 2016/0101384 A1    Apr. 14, 2016

Related U.S. Application Data

(60) Division of application No. 13/968,703, filed on Aug. 16, 2013, now Pat. No. 9,242,203, which is a continuation of application No. PCT/IB2012/000231, filed on Feb. 8, 2012.

(30) Foreign Application Priority Data

Feb. 18, 2011 (EP) .................................. 11154939

(51) Int. Cl.
| | |
|---|---|
| *B01D 53/02* | (2006.01) |
| *B01D 53/08* | (2006.01) |
| *B01D 53/14* | (2006.01) |
| *B01D 53/68* | (2006.01) |
| *B01D 53/50* | (2006.01) |

(52) U.S. Cl.
CPC ............ *B01D 53/08* (2013.01); *B01D 53/1437* (2013.01); *B01D 53/508* (2013.01); *B01D 53/685* (2013.01); *B01D 2252/1035* (2013.01); *B01D 2252/60* (2013.01); *B01D 2253/104* (2013.01); *B01D 2257/2047* (2013.01); *B01D 2257/302* (2013.01)

(58) Field of Classification Search
CPC ................. B01D 2253/104; B01D 2257/2047; B01D 53/10; B01D 53/1437; B01D 53/508; B01D 53/685; C25C 3/22
See application file for complete search history.

(56) References Cited

U.S. PATENT DOCUMENTS

| | | | |
|---|---|---|---|
| 3,248,177 A | 4/1966 | Grolee | |
| 4,006,066 A | 2/1977 | Sparwald | |
| 4,101,393 A | 7/1978 | Hargis | |
| 4,336,035 A | 6/1982 | Evenstad et al. | |

(Continued)

FOREIGN PATENT DOCUMENTS

| | | |
|---|---|---|
| CN | 1570789 A | 1/2005 |
| CN | 1935644 A | 3/2007 |

(Continued)

*Primary Examiner* — Christopher P Jones
(74) *Attorney, Agent, or Firm* — Rita D. Vacca

(57) ABSTRACT

A gas cleaning unit for cleaning an effluent gas of at least one aluminium production electrolytic cell comprises a contact reactor in which the effluent gas is brought into contact with alumina, and a dust removal device for removing at least a portion of the alumina. The gas cleaning unit further comprises a wet scrubber in which the effluent gas is brought into contact with an absorption liquid containing water for removing further pollutants from the effluent gas. The wet scrubber is positioned at a point vertically higher than that of the dust removal device.

4 Claims, 2 Drawing Sheets

(56) References Cited

U.S. PATENT DOCUMENTS

| | | |
|---|---|---|
| 4,501,599 A | 2/1985 | Loukos |
| 4,502,872 A | 3/1985 | Ivester et al. |
| 4,770,752 A | 9/1988 | Gianfranco |
| 5,814,127 A | 9/1998 | Li |
| 5,885,539 A | 3/1999 | Bjarno et al. |
| 6,352,578 B1 | 3/2002 | Sakata et al. |
| 6,406,524 B1 | 6/2002 | Wedde |
| 2004/0076571 A1 | 4/2004 | Drouin et al. |
| 2006/0289290 A1 | 12/2006 | Girault et al. |
| 2008/0050298 A1 | 2/2008 | Meyden et al. |
| 2009/0159434 A1 | 6/2009 | Girault et al. |
| 2013/0206005 A1 | 8/2013 | Sorhuus et al. |

FOREIGN PATENT DOCUMENTS

| | | |
|---|---|---|
| CN | 1989345 A | 6/2007 |
| CN | 101348924 | 1/2009 |
| CN | 101400948 A | 4/2009 |
| CN | 101848759 A | 9/2010 |
| EP | 1 025 284 | 9/2003 |
| EP | 2 181 753 | 5/2010 |
| RU | 1794197 A3 | 2/1993 |
| WO | 98/28062 | 7/1998 |
| WO | 2012/007809 | 1/2012 |

DEVICE AND A METHOD OF CLEANING AN EFFLUENT GAS FROM AN ALUMINIUM PRODUCTION ELECTROLYTIC CELL

CROSS-REFERENCE TO RELATED APPLICATIONS

This application claims priority to and is a divisional of U.S. application Ser. No. 13/968,703, filed on Aug. 16, 2013, which in turn claims priority to PCT Application No. PCT/IB2012/000231, filed on Feb. 8, 2012, which in turns claims priority to European Application No. 11154939.0, filed Feb. 18, 2011, the contents of which are all hereby incorporated in their entirety.

FIELD OF THE INVENTION

The present invention relates to a gas cleaning unit for cleaning an effluent gas of at least one aluminium production electrolytic cell, the gas cleaning unit comprising at least one contact reactor in which the effluent gas is brought into contact with alumina, and a dust removal device in which at least a portion of the alumina having adsorbed pollutants from the effluent gas in the contact reactor is separated from the effluent gas.

The present invention further relates to a method of cleaning an effluent gas of at least one aluminium production electrolytic cell.

BACKGROUND

Aluminium may be produced by electrolytic reactions in aluminium production electrolytic cells, sometimes called electrolytic smelting pots, using the Hall-Héroult process. An example of an electrolytic smelting pot is disclosed in US 2009/0159434.

The electrolytic reaction occurring in the electrolytic smelting pots produces effluent gas in the form of hot, particle-laden effluent gas, which is cleaned in a gas cleaning unit before being discharged to the atmosphere. An example of a gas cleaning unit for cleaning the effluent gas generated in electrolytic smelting pots is disclosed in U.S. Pat. No. 5,885,539. The gas cleaning unit disclosed in U.S. Pat. No. 5,885,539 comprises a first contact reactor and a second contact reactor. The effluent gas from the electrolytic smelting pots is first forwarded to the first contact reactor and is, in the first contact reactor, brought into contact with recycled alumina. The partly cleaned effluent gas is then forwarded to the second contact reactor and is, in the second contact reactor, brought into contact with fresh alumina. The partly used alumina is recycled from the second contact reactor to the first contact reactor. A dust removal device removes the alumina from the effluent gas which is then discharged to the atmosphere.

SUMMARY

An object of the present invention is to provide a gas cleaning unit for removing gaseous pollutants from an effluent gas of an aluminium production electrolytic cell that is more efficient with respect to efficiency of removing pollutants from the effluent gas than that of the prior art.

The above-noted object is achieved by a gas cleaning unit for cleaning an effluent gas of at least one aluminium production electrolytic cell, the gas cleaning unit comprising at least one contact reactor in which the effluent gas is brought into contact with alumina, and a dust removal device in which at least a portion of the alumina having adsorbed pollutants from the effluent gas in the contact reactor is separated from the effluent gas. The gas cleaning unit further comprises a wet scrubber in which the effluent gas being forwarded from the dust removal device is brought into contact with an absorption liquid containing water for removing further pollutants from the effluent gas, the wet scrubber being arranged on a higher vertical level than the dust removal device.

An advantage of the above-described gas cleaning unit is that a very efficient removal of pollutants, such as sulphur dioxide, hydrogen fluoride, and dust particles, from the effluent gas is obtained, both with regard to the removal efficiency as such, and with regard to the investment and operating costs of the gas cleaning unit. A very compact gas cleaning unit may be obtained, with minimal duct work required, and minimum effluent gas transport distances. The relatively short effluent gas transport distances result in relatively low gas cleaning unit pressure drop and energy consumption.

According to one embodiment the wet scrubber portion of the subject gas cleaning unit is positioned at a point vertically higher than and beside the dust removal device. An advantage of this embodiment is that a very compact gas cleaning unit is obtained, without sacrificing service and maintenance of the dust removal device.

According to one embodiment of the subject gas cleaning unit, an alumina silo is arranged beside the dust removal device with the wet scrubber positioned over at least a portion of the alumina silo and at least partly obscuring the alumina silo when the wet scrubber is viewed from above. An advantage of this embodiment is that the silo is efficiently integrated in the gas cleaning unit with the wet scrubber positioned above the alumina silo, which infrequently requires any maintenance work.

According to one embodiment the dust removal device comprises a clean gas plenum arranged at the top thereof. The wet scrubber device is fluidly connected to the clean gas plenum via an outlet duct arranged in a side wall of the clean gas plenum. An advantage of this embodiment is that a combination of good serviceability with regard to the dust removal device and compact arrangement with regard to short transport distances for the effluent gas, results in low gas cleaning unit energy consumption.

According to one embodiment a fan is connected to an outlet duct of a clean gas plenum of the dust removal device to cause a flow of effluent gas from the clean gas plenum to the wet scrubber. An advantage of this embodiment is that the fan is integrated for the flow of the effluent gas from the clean gas plenum to the wet scrubber. Hence, no, or only limited, space is required for the fan, and a very compact arrangement is obtained.

According to one embodiment a radial fan comprising an impeller rotating on a horizontal shaft receives effluent gas flowing in a horizontal direction from the clean gas plenum of the dust removal device and transports the effluent gas upward into the wet scrubber positioned thereabove. An advantage of this embodiment is that the radial fan performs the dual functions of forwarding the flow of effluent gas from the clean gas plenum of the dust removal device to the wet scrubber, and of diverting the flow of effluent gas from a horizontal flow to an upward vertical flow.

According to one embodiment the dust removal device and the wet scrubber together form a common stacked unit, and are supported on a common support structure. An advantage of this embodiment is that the gas cleaning unit is less complex, requires an overall smaller footprint and has a lower investment cost, since the number of required support structures is minimized.

According to one embodiment a gas cleaning unit penthouse houses at least a part of a clean gas plenum of the dust removal device, and at least a part of the wet scrubber. An advantage of this embodiment is that the wet scrubber and the clean gas plenum are protected from, for example, wind loads, precipitation, sunlight, and sand storms. As such, requirements with regard to suitable equipment material types and material dimensions may be lowered, thereby reducing required investment costs.

According to one embodiment a wet scrubber inlet opening for receiving effluent gas flowing from the dust removal device is arranged in a bottom of the wet scrubber. An advantage of this embodiment is that the wet scrubber can be arranged in very close proximity to the dust removal device, since positioned at a level vertically above the level of the dust removal device. Preferably, a gas distributor is arranged at the bottom of the wet scrubber for distributing effluent gas that enters the wet scrubber from below.

According to one embodiment a stack for discharging cleaned effluent gas is arranged on top of the wet scrubber. An advantage of this embodiment is that the wet scrubber also serves as a part of the stack. Furthermore, there is no need for long ducts to channel the flow of cleaned effluent gas to a remotely arranged stack. As such, investment, operating and maintenance costs are reduced.

A further object of the present invention is to provide a method of removing gaseous pollutants from an effluent gas of an aluminium production electrolytic cell that is more efficient with respect to removing pollutants from the effluent gas than is the method of the prior art.

This object is achieved by means of a method comprising:

contacting effluent gas with alumina adsorbing at least a portion of the content of pollutants of the effluent gas;

separating at least a portion of adsorbed pollutants from the effluent gas using a dust removal device; and contacting the effluent gas with an absorption liquid comprising water in a wet scrubber positioned at a point vertically higher than that of said dust removal device to further remove pollutants from the effluent gas.

An advantage of this method is that pollutants may be removed from the effluent gas in an efficient manner with respect to investment and operating costs, and with respect to the cleaned effluent gas purity level upon release from the gas cleaning unit.

According to one method embodiment, the effluent gas from which at least a portion of the alumina has been separated is forwarded into a clean gas plenum arranged at the top of the dust removal device. The effluent gas flows horizontally out of the clean gas plenum before being diverted to flow vertically upward into the wet scrubber. An advantage of this embodiment is that a compact and efficient arrangement is obtained, which still enables maintenance of the dust removal device.

According to one method embodiment, the effluent gas flows upwardly and/or horizontally while being subjected to the steps of: contacting alumina, separating from the alumina, entering the wet scrubber, and contacting absorption liquid in the wet scrubber, during which the effluent gas flows upwardly in at least one of the steps. With the gas flowing upwardly, and optionally horizontally, for shorter distances, during the treatment steps, the effluent gas moves a relatively short total distance. Additionally, the gas does not move downwardly to any substantial extent during the treatment steps. Such reduces investment and operating costs by minimizing gas duct lengths and required fan power. Also, the method may be conducted in a gas cleaning unit having a relatively smaller overall footprint.

Further objects and features of the present invention will be apparent from the following detailed description and claims.

BRIEF DESCRIPTION OF THE DRAWINGS

The invention is described in more detail below with reference to the appended drawings in which.

DETAILED DESCRIPTION

Figure 1:
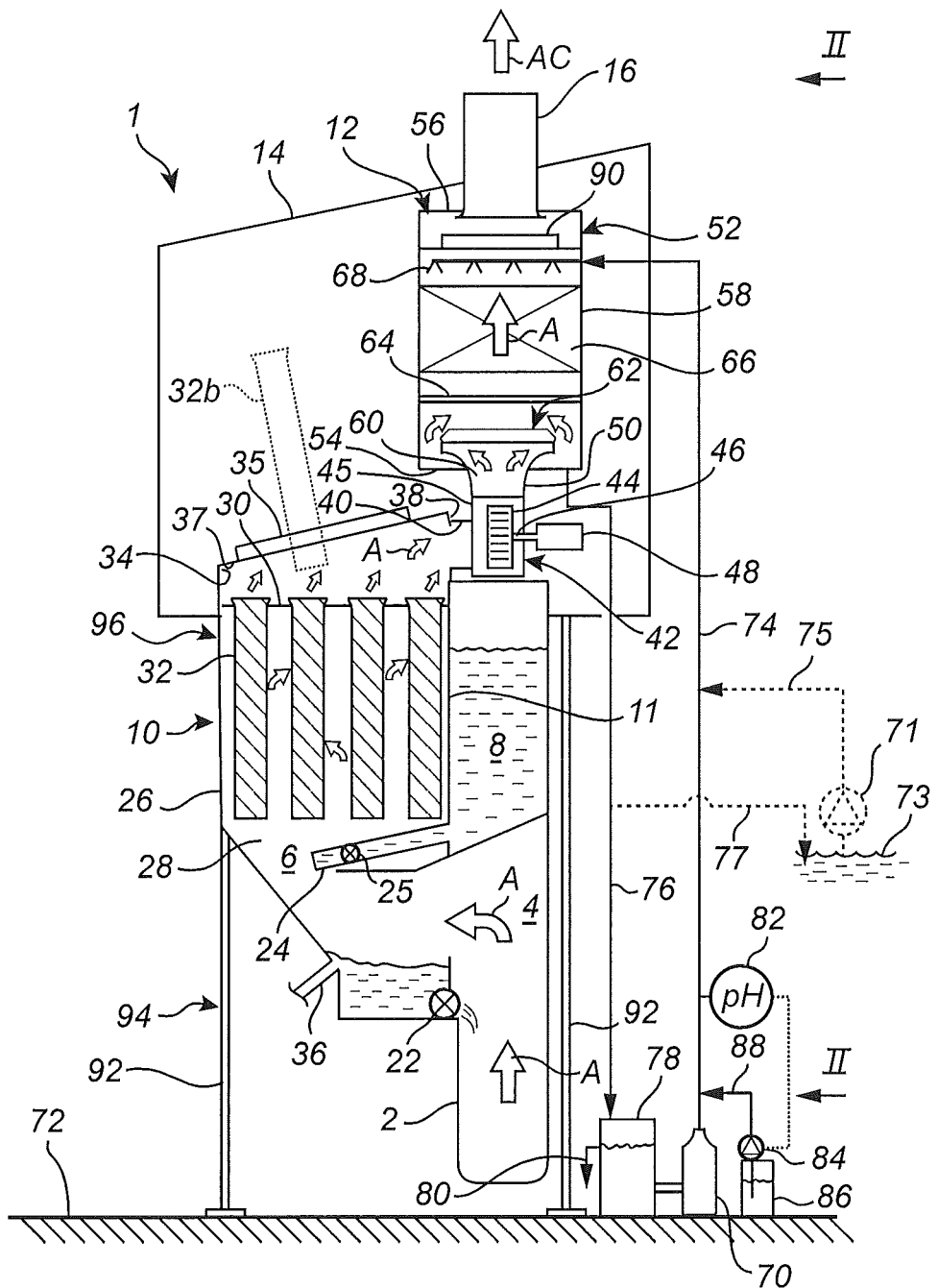
FIG. 1 is a schematic side view, in cross-section, of a gas cleaning unit cleaning effluent gas from at least one aluminium production electrolytic cell.

FIG. 1 is a schematic representation of a gas cleaning unit 1 in cross-section viewed from the side thereof. The gas cleaning unit 1 comprises, as its main components, a gas inlet duct 2, a first contact reactor 4, a second contact reactor 6, an alumina silo 8, a dust removal device 10, a wet scrubber 12, a gas cleaning unit penthouse 14, and a stack 16. Arrows A indicate the intended flow path of the effluent gas through the gas cleaning unit 1.

Figure 2:
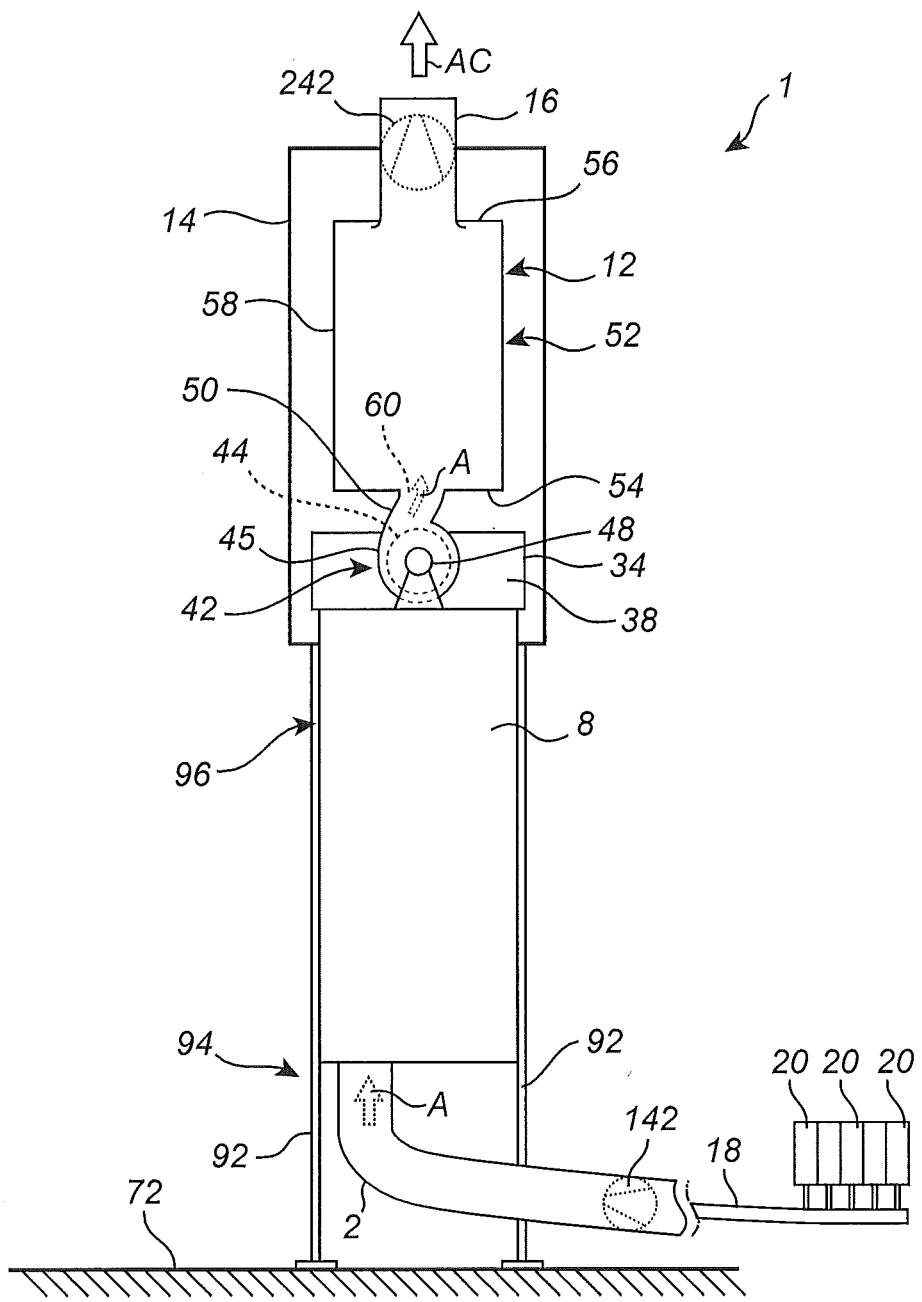
FIG. 2 is a schematic side view of a gas cleaning unit, viewed in the direction depicted by arrows II-II of FIG. 1.

FIG. 2 illustrates the gas cleaning unit 1 viewed in the direction of arrows II-II of FIG. 1, i.e., as viewed from the side of FIG. 1. The gas inlet duct 2 is connected to a collecting duct 18, illustrated schematically and not drawn to scale, collecting effluent gas from each of, typically, 1 to 400, more typically 5 to 200, aluminium production electrolytic cells 20, each of which may be operative for producing aluminium in accordance with, for example, the above mentioned Hall-Héroult process.

Returning to FIG. 1, the gas inlet duct 2 channels the effluent gas flow from the aluminium production electrolytic cells to the first contact reactor 4. A volumetric feeder 22 is operative for recirculating alumina, $Al_2O_3$, in the first contact reactor 4 to provide for efficient contact between the alumina and the effluent gas. As an effect of such contact, gaseous pollutants, such as hydrogen fluoride, HF, and sulphur dioxide, $SO_2$, are adsorbed by the alumina.

The effluent gas flows further to the second contact reactor 6. A supply pipe 24 with a volumetric feeder 25 is arranged for supplying fresh alumina to the second contact reactor 6 from the fluidly connected alumina silo 8. The fresh alumina effects a further adsorption of pollutants from the effluent gas on alumina. The alumina silo 8 is arranged beside the dust removal device 10, and share a common vertical side wall 11. The wet scrubber 12 is arranged above the alumina silo 8 and at least partly obscures the view of alumina silo 8 when looking vertically downward from the top of the wet scrubber 12, as is clear from the combined perspectives of FIG. 1 and FIG. 2.

The effluent gas, comprising particles entrained from the aluminium production electrolytic cells 20, recycled alumina entrained from the first contact reactor 4, and fresh alumina entrained from the second contact reactor 6, flows to the dust removal device 10. The dust removal device 10 is arranged above the second contact reactor 6. The dust removal device 10 may, for example, be an electrostatic precipitator, the basic principle of which is known from, for example, U.S. Pat. No. 4,502,872, or a fabric filter, the basic principle of which is known from, for example, U.S. Pat. No. 4,336,035.

The dust removal device illustrated in FIG. 1 is a fabric filter 10. The fabric filter 10 comprises a housing 26. The effluent gas enters the housing 26 via an open lower end 28 thereof. A horizontal plate 30 is arranged in an upper end of the housing 26. Extending from plate 30 are a number of fabric filtering devices in the form of fabric bags 32, each such fabric bag 32 extending through a corresponding opening in the plate 30. Typically, a fabric filter 10 may comprise 2 to 40 000 such fabric bags 32. In operation, effluent gas, loaded with dust particles, including alumina, enters the open lower end 28 of the housing 26. The effluent gas passes through the fabric of the bags 32 and into the interior of the bags 32, while the dust particles are collected on the outside of the bags 32. Then, effluent gas, from which at least a portion of the dust particles have been separated, flows via the interior of the bags 32, upward through the plate 30, and enters a clean gas plenum 34 of the fabric filter 10. Occasionally, the collected dust particles are removed from the bags 32, for example by pulsing the bags 32 with pressurized air, in accordance with the principles disclosed in U.S. Pat. No. 4,336,035, or by shaking the bags 32. The dust particles thereby removed from the bags 32 are partly returned to the contact reactors 4, 6, and partly removed from the gas cleaning unit 1 via an outlet 36. The removed particles would normally be directly transported to the aluminium production electrolytic cells 20 illustrated in FIG. 2.

Continuing with the description of FIG. 1, the clean gas plenum 34, which is arranged at the top of the fabric filter 10, above the plate 30 and the bags 32, is provided, in a vertical side wall 38 thereof, with a horisontal outlet duct 40. The outlet duct 40 is fluidly connected to a fan 42, which in the example of FIG. 1 is a radial fan 42. The radial fan 42 is provided with an impeller 44 arranged within a housing 45 of the fan 42 and rotated by a horizontal shaft 46 driven by a motor 48. The effluent gas, flowing horizontally through the outlet duct 40, enters the radial fan 42 in the axial direction of the impeller 44 and is given an impulse in a vertical direction, radially of the impeller 44. The effluent gas is forwarded upwardly by fan 42 and leaves fan 42 substantially vertically via fan outlet 50.

FIG. 2 illustrates, schematically, two alternative locations of a fan. In accordance with a first alternative embodiment, a fan 142 may be arranged in the gas inlet duct 2. In accordance with a second alternative embodiment, a fan 242 may be arranged just after the wet scrubber 12. Fans 142, 242 could be utilized as alternatives to, or in combination with, fan 42 for generating a flow of effluent gas through the gas cleaning unit 1.

The wet scrubber 12 comprises a housing 52. The housing 52 comprises a horizontal bottom 54, a horizontal roof 56, and a generally cylindrical side wall 58 extending between the bottom 54 and the roof 56. The housing 52 of the wet scrubber 12 is entirely located inside the penthouse 14 of the gas cleaning unit 1. This means that the housing 52 of the wet scrubber 12 is protected from wind loads, UV-radiation, precipitation, sand storms, etc, which substantially reduces the material and load requirements on the wet scrubber 12 housing 52.

The wet scrubber 12 housing 52 is arranged at a point above or vertically higher than and just beside the fabric filter 10, as is best illustrated in FIG. 1. Upon exchanging worn or damaged filter bags 32, the filter bags 32 may be removed through vertically upward movement thereof through hatches 35 arranged in the roof 37 of the clean gas plenum 34. A filter bag 32b, illustrated with dotted lines, indicates the position of the filter bag 32b during the removal/exchange thereof. By arranging the wet scrubber 12 housing 52 beside the fabric filter 10 clean gas plenum 34 the exchange of filter bags 32 is not obstructed by the housing 52. As can be seen from FIGS. 1 and 2, the wet scrubber 12 housing 52 is arranged just above the alumina silo 8.

The wet scrubber 12 bottom 54 is provided with an inlet opening 60 which is fluidly connected to the fan outlet 50. The inlet opening 60 is fluidly connected to a gas distributor 62, which distributes the gas coming from the fan 42 inside the housing 52 of the wet scrubber 12. An optional horizontal gas distribution grid 64 may be arranged above the gas distributor 62 inside the housing 52 to support the formation of an even gas distribution profile of the effluent gas inside the housing 52. Optionally, a gas-liquid contacting packing 66 may be arranged inside the housing 52, above the gas distributor 62 and gas distribution grid 64, to improve contact between effluent gas and an absorption liquid supplied via nozzles 68 arranged inside the housing 52, above the distributor 62, grid 64, and packing 66. Examples of such gas-liquid packing 66 include Mellapak™ available from Sulzer Chemtech AG, Winterthur, CH, and Pall™ rings available from Raschig GmbH, Ludwigshafen, DE. In accordance with one embodiment, the gas-liquid packing 66 may be a wooden packing made from a grid of wooden rods. A wooden packing makes it possible to operate the wet scrubber 12 without supply of absorption liquid for shorter periods of time, without causing damage to the packing material.

The absorption liquid would typically comprise water along with an alkali substance. The alkali substance may for example be sodium hydroxide, NaOH, sodium carbonate, $Na_2CO_3$, calcium hydroxide, CaOH, limestone, $CaCO_3$, or any other substance that is suitable for neutralising the acid pollutants of the effluent gas, including for example sulphur dioxide, $SO_2$, and hydrogen fluoride, HF, that are to be removed from the effluent gas by the wet scrubber 12. In accordance with a further embodiment, the absorption liquid comprising water along with an alkali substance could, at least in part, be supplied to the wet scrubber 12 in the form of seawater, for example in the form of seawater from a nearby ocean. When operating the scrubber with seawater, the seawater would be passed through the wet scrubber 12 to absorb and neutralize sulphur dioxide and hydrogen fluoride from the effluent gas, after which the seawater would be returned to the ocean.

For example, the absorption and neutralisation of sulphur dioxide and hydrogen fluoride from the effluent gas using sodium hydroxide, NaOH, could occur in accordance with the following reactions:

$$SO_2(g) + 2NaOH(aq) + \tfrac{1}{2}O_2(g) \Rightarrow Na_2SO_4(aq) + H_2O \qquad [\text{eq. 1.1}]$$

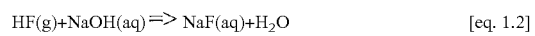

$$HF(g) + NaOH(aq) \Rightarrow NaF(aq) + H_2O \qquad [\text{eq. 1.2}]$$

A pump 70 is arranged on the ground 72 and is arranged for pumping absorption liquid via fluidly connected supply pipe 74 to the fluidly connected nozzles 68. The nozzles 68 atomize the absorption liquid and brings it into contact, optionally with the aid of the gas-liquid contacting packing 66, with the effluent gas flowing vertically upward inside the housing 52 of the wet scrubber 12. The spent absorption liquid is collected on the bottom 54 of the housing 52 and flows, via a fluidly connected pipe 76, to a circulation tank 78. The circulation tank 78 is fluidly connected to the pump 70 which returns the absorption liquid to the nozzles 68. An overflow pipe 80 is connected to the tank 78 for removing excess absorption liquid.

A pH measurement device 82 is connected to the pipe 74 for measuring the pH of the absorption liquid. The pH measurement device 82 controls a pump 84 which pumps an alkali solution, such as an NaOH solution, from a storage tank 86 to the pipe 74 via fluidly connected supply pipe 88. The pH measurement device 82 controls the pump 84 to keep the pH value in the absorption liquid supplied to the nozzles 68 via fluidly connected pipe 74 at a predetermined value, for example at pH 6.5.

In accordance with an alternative embodiment, a pump 71 is arranged for pumping seawater, having a pH of, for example, around 7.5 to 8.5, from a nearby ocean 73 to the supply pipe 74 via fluidly connected pipe 75. The seawater is utilized as an absorption liquid in the wet scrubber 12 to absorb and neutralize sulphur dioxide and hydrogen fluoride in accordance with reactions that are similar to those described hereinbefore with regard to NaOH. After such absorption and neutralisation, the seawater is returned to the ocean 73 via pipe 76 and fluidly connected pipe 77. Optionally, some fresh water, or some recirculated seawater, may be circulated in the wet scrubber 12, together with the supply of fresh seawater from the ocean 73.

A droplet eliminator 90 is arranged vertically above the nozzles 68. The droplet eliminator 90 removes any droplets contained in the effluent gas before allowing the effluent gas to enter the stack 16. The cleaned effluent gas, illustrated by means of an arrow AC, leaves the stack 16 and is discharged into the atmosphere.

The gas cleaning unit 1 is supported on stands 92 forming together a common support structure 94. The contact reactors 4, 6, the fabric filter 10, and the wet scrubber 12, except ancillary equipment such as pump 70 and tank 78, together form a common stacked unit 96 which is supported by the common support structure 94 being common to the contact reactors 4, 6, the fabric filter 10, and the wet scrubber 12. In the embodiment of FIGS. 1 and 2 the alumina silo 8, the penthouse 14, and the stack 16 also form part of the stacked unit 96, and are supported by the common support structure 94. As is clear from a reference to FIGS. 1 and 2 the entire gas cleaning unit 1 has a very small footprint with the wet scrubber 12 being arranged on a higher vertical level than the fabric filter 10, and above the alumina silo 8. Furthermore, the outlet duct 40 forwarding the effluent gas from the fabric filter 10 to the wet scrubber 12 is very short, typically only 0.1 to 2 m. Still further, the stack 16 is also very short, since it is arranged directly on top of the housing 52 of the wet scrubber 12, which is already located on a considerable height above the ground 72.

A method of cleaning effluent gas in the gas cleaning unit 1 involves introducing the effluent gas via the gas inlet duct 2. The effluent gas is brought into contact with recycled alumina particles in the first contact reactor 4 causing adsorption of hydrogen fluoride and sulphur dioxide on the alumina particles. A further adsorption occurs in the second contact reactor 6. The effluent gas is then filtered in the fabric filter 10. Such filtering causes a removal of entrained dust particles and alumina laden with hydrogen fluoride and sulphur dioxide. The filtered effluent gas is then forwarded from the clean gas plenum 34 of the fabric filter 10 and is almost immediately introduced in the wet scrubber 12 via the inlet opening 60 thereof. Inside the housing 52 of the wet scrubber 12 the effluent gas is brought into contact with an absorption liquid causing a further removal of sulphur dioxide and hydrogen fluoride. The cleaned effluent gas is discharged to the atmosphere via a stack 16 arranged immediately on top of the wet scrubber 12 housing 52.

It will be appreciated that numerous variants of the embodiments described above are possible within the scope of the appended claims.

Hereinbefore, it has been described that the effluent gas enters the wet scrubber 12 housing 52 via an inlet opening 60 in the bottom 54 of the wet scrubber 12. It will be appreciated that an inlet opening may also be arranged in other positions at the wet scrubber 12 housing 52. For example, an inlet opening may be arranged in a lower portion of the wet scrubber 12 cylindrical side wall 58. Still further, an inlet opening may be arranged in that position on the wet scrubber 12 housing 52 where bottom 54 is joined to side wall 58.

Hereinbefore, it has been described that the wet scrubber 12 is provided with a packing 66. It will be appreciated that the wet scrubber 12 may also be designed without any packing, in which case the mixing of absorption liquid and effluent gas relies on the atomization of absorption liquid by nozzles 68. An example of a useful nozzle 68 is the WhirlJet™ nozzle available from Spraying Systems Co, Wheaton, Ill., USA. It will be appreciated that nozzles 68 could be arranged in several different vertical levels inside the wet scrubber 12 housing 52. Furthermore, the nozzles 68 could be arranged to spray the liquid counter-current, as illustrated in FIG. 1, co-current, or both counter-current and co-current, in relation to the flow of effluent gas.

Hereinbefore it has been described that the gas cleaning unit 1 comprises a first and a second contact reactor 4, 6 in which the effluent gas is brought into contact with alumina. It will be appreciated that a gas cleaning unit could also, in accordance with an alternative embodiment, be provided with a single contact reactor, in which the effluent gas is brought into contact with recirculated and fresh alumina. In accordance with a further alternative embodiment, a gas cleaning unit could be provided with three or more contact reactors arranged in series.

Hereinbefore it has been described that the fan 42 is a radial fan. It will be appreciated that other types of fans, for example axial fans, could also be utilized for forwarding the effluent gas through the gas cleaning unit 1.

Hereinbefore it has been described that the pump 70, tank 78 and pH adjustment equipment 82, 84, 86, 88 are all arranged on the ground 72. It will be appreciated that it would also be possible to arrange some or all of these devices in another location. In accordance with one embodiment, at least one of the pump 70, the tank 78, the associated pipes 76, 74, and the pH adjustment equipment 82, 84, 86, 88 is arranged inside the gas cleaning unit 1 penthouse 14. In accordance with a further embodiment, the pump 70, the tank 78, the associated pipes 76, 74, and the pH adjustment equipment 82, 84, 86, 88 are all arranged inside the penthouse 14.

Hereinbefore it has been described that the alumina silo 8 is integrated in the gas cleaning unit 1. It will be appreciated that it is also possible to design a gas cleaning unit having no alumina silo 8 integrated therein. In such a case, fresh alumina may be supplied from a remote central alumina storage, fluidly connected to supply pipe 24.

Hereinbefore, the gas cleaning unit 1 has been described as comprising one fabric filter 10, and one wet scrubber 12. It will be appreciated that a gas cleaning unit could be provided with several parallel fabric filters, for example 2 to 100 parallel fabric filters, and a number of parallel wet scrubbers, for example 2 to 100 parallel wet scrubbers. The number of wet scrubbers need not correspond to the number of fabric filters. Hence, for example, two parallel fabric filters could be fluidly connected to one common wet scrubber.

To summarize, a gas cleaning unit 1 for cleaning an effluent gas of at least one aluminium production electrolytic cell comprises a contact reactor 4, 6 in which the effluent gas is brought into contact with alumina, and a dust removal device 10 for removing at least a portion of the alumina. The gas cleaning unit 1 further comprises a wet scrubber 12 in which the effluent gas is brought into contact with an absorption liquid containing water for removing further pollutants from the effluent gas. The wet scrubber 12 is positioned at a point vertically higher than that of the dust removal device 10.

While the present invention has been described with reference to a number of preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method of cleaning pollutants from an effluent gas produced by at least one aluminium production electrolytic cell comprising:
    providing a gas cleaning unit;
    contacting within at least one contact reactor of the gas cleaning unit the effluent gas with alumina;
    separating within a dust removal device of the gas cleaning unit at least a portion of the alumina having adsorbed pollutants from the effluent gas in the contact reactor from the effluent gas; and
    contacting within a wet scrubber of the gas cleaning unit arranged at a point vertically higher than that of the dust removal device within the gas cleaning unit effluent gas flowing vertically upwardly from the dust removal device through a bottom of the wet scrubber with an absorption liquid containing water for removing further pollutants from the effluent gas.

2. The method according to claim 1, further comprising passing the effluent gas from which at least a portion of the pollutants has been separated within the dust removal device into a clean gas plenum arranged at a top of the dust removal device, for effluent gas flow horizontally out of the clean gas plenum and vertically upward flow into the wet scrubber.

3. The method according to claim 1, wherein contacting the effluent gas within the wet scrubber requires flow of the effluent gas vertically upward into a housing of the wet scrubber via a bottom of the wet scrubber housing.

4. The method according to claim 1, wherein passing the effluent gas from the contact reactor to the dust removal device is a vertically upward flow, and passing the effluent gas from the dust removal device to the wet scrubber is a vertically upward flow.

* * * * *